Nov. 6, 1962 R. J. STEPHENS 3,062,248
TANK CAPACITY CALIBRATING APPARATUS
Filed Nov. 7, 1958 2 Sheets-Sheet 1
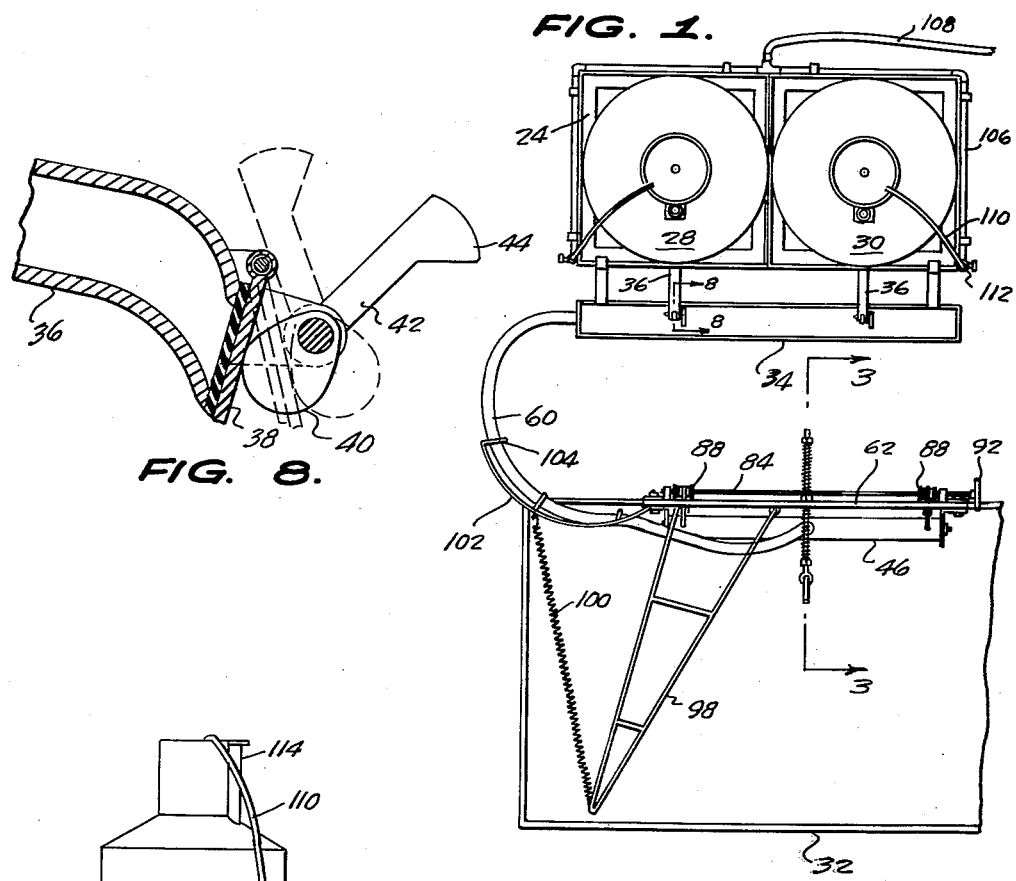
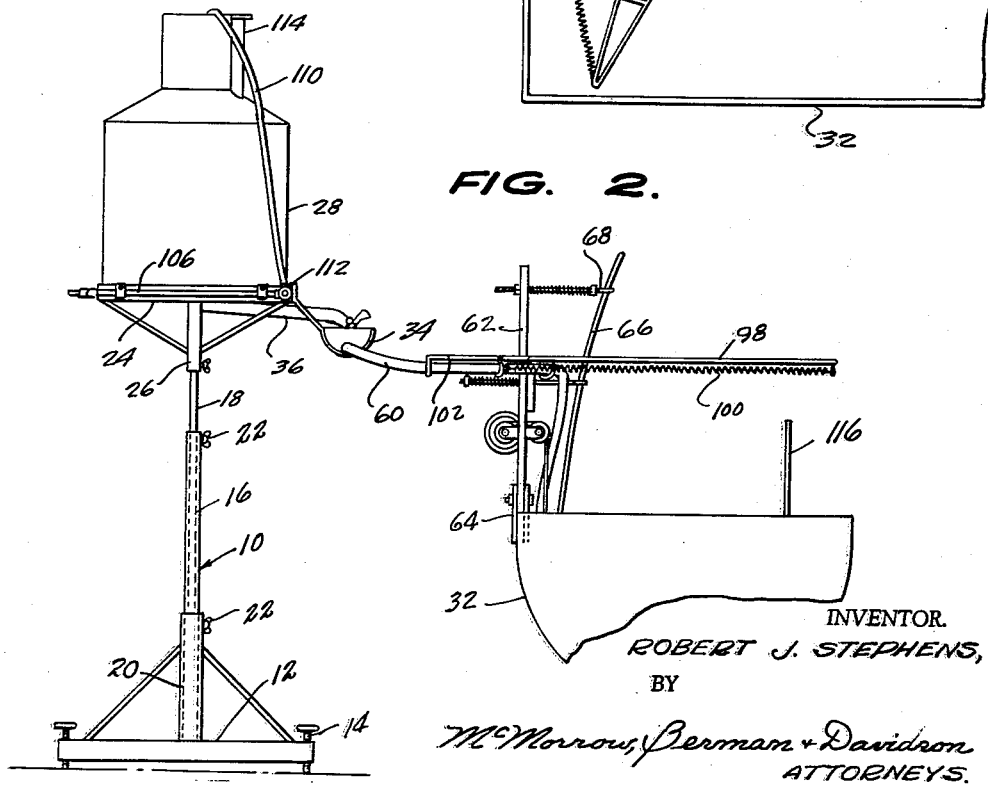
INVENTOR.
ROBERT J. STEPHENS,
BY
McMorrow, Berman & Davidson
ATTORNEYS.

Nov. 6, 1962 R. J. STEPHENS 3,062,248
TANK CAPACITY CALIBRATING APPARATUS
Filed Nov. 7, 1958 2 Sheets-Sheet 2
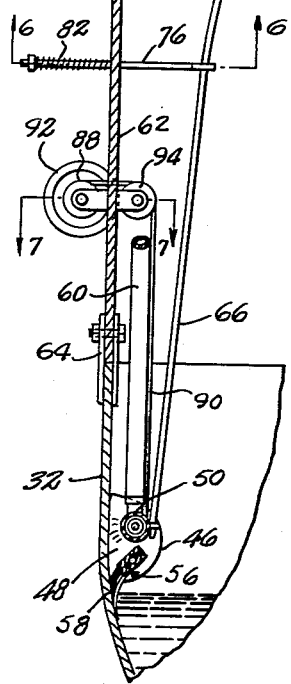
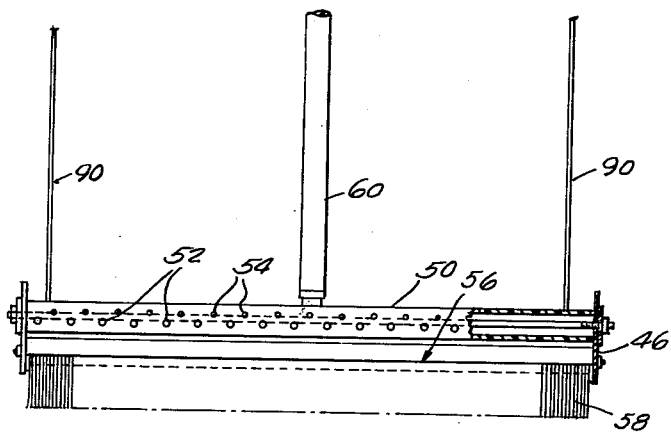
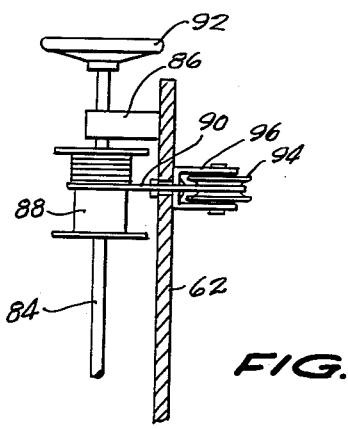
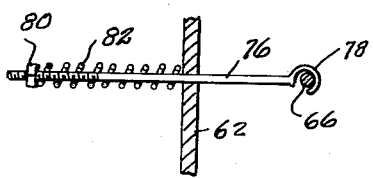
FIG. 3.
FIG. 4.
FIG. 5.
FIG. 6.
FIG. 7.
INVENTOR.
ROBERT J. STEPHENS,
BY
McMorrow, Berman & Davidson
ATTORNEYS.

United States Patent Office 3,062,248
Patented Nov. 6, 1962

3,062,248
TANK CAPACITY CALIBRATING APPARATUS
Robert J. Stephens, Maringouin, La.
(2650 N. Boulevard St., Apt. 3, Baton Rouge, La.)
Filed Nov. 7, 1958, Ser. No. 772,440
4 Claims. (Cl. 141—279)

The present invention relates to an apparatus for calibrating the liquid capacity of a tank.

In the dairying industry, it is generally the practice of the dairy farmer to temporarily store in a tank the milk produced for sale. The tank is emptied into the tank of a tank truck for transport to the processing plant. Due to the fact that milk from more than one farm is collected by the tank truck, the computing of the sale price of the milk from a particular farm necessarily must be done at the time the farm's storage tank is emptied.

Each farm storage tank is provided with a means for measuring the depth of milk in the tank. The simplest form of such measuring means consists in a stainless steel rod marked off in inches and fraction of inches. Other measuring means embody floats and other level indicating devices. The depth of the milk in each tank, before emptying into the collection tank, is translated by computation of the depth to gallons, and the gallons to pounds which is the basis for payment to the dairy farmer for his product.

It has been found that the measurement of the depth of the milk in the tank, before emptying into the mobile collection tank, is not always an accurate method of determining the gallonage or weight of the milk. Tanks for the storage of milk are usually installed by the establishment providing the tank. The tanks are frequently installed so that their bottoms are on a slight grade in order that complete drainage be provided. Settling of the foundations for the tank, warping of the tank sides and ends, and other factors such as dents in the walls and bottoms of the tank, upset the tank capacity calibration as originally determined. In order that the purchase of milk by the processor be equitable to the parties involved, the liquid volume of each storage tank from which milk is sold must be positively known. Additionally, civic authorities having cognizance over weights and measures periodically check the liquid volume capacity of each tank. Heretofore, the liquid volume capacity of each tank has been determined by laboriously pouring into the tank when empty of milk, a body of water of a known liquid quantity, measuring the depth of liquid in the tank, and in succession pouring further water in known quantities into the tank and measuring the depth between each pouring. Not only is this method laborious and time consuming but it is generally inaccurate for the reason that the water as it is poured into the tank sloshes from one end to the other end of the tank in waves and it is impractical to wait until the surface of the water is completely stilled before the depth is measured. Hence, only the mean average depth is measured each time, the wet mark on the dip stick being the gauge line, although due to the waves in the tank, the wet mark is clearly not the true level of the charge of water put into the tank.

An object of the present invention therefore is to provide an apparatus for calibrating the liquid capacity of a tank in multiples of known liquid measure units with ease and facility, without the expenditure of either excess labor or time, and with rapidity and optimum efficiency.

Another object of the present invention is to provide an apparatus for calibrating the liquid capacity of a tank in multiples of known liquid measure units which is readily portable, one easily and rapidly erected when used, one easily and rapidly disassembled and made ready for transport to another location of use, and one which is economically feasible.

A further object of the present invention is to provide an apparatus for calibrating the liquid capacity of a tank in multiples of known liquid measure units which is simple in construction, one simple in structure and easily fabricated of conventional components, and one which is highly effective in action.

These and other objects and advantages of the present invention will be fully apparent from the following description when taken in conjunction with the annexed drawings, in which:

FIGURE 1 is a plan view of the apparatus of the present invention shown installed adjacent to and connected to a tank, a portion of the tank being shown broken away;

FIGURE 2 is an elevational view of the assembly shown in FIGURE 1;

FIGURE 3 is a view on an enlarged scale, taken on the line 3—3 of FIGURE 1;

FIGURE 4 is an elevational view of the water distributing and spreading member employed in the apparatus of the present invention;

FIGURE 5 is a view on an enlarged scale, taken on the line 5—5 of FIGURE 3;

FIGURE 6 is a view on an enlarged scale, taken on the line 6—6 of FIGURE 3;

FIGURE 7 is a view on an enlarged scale, taken on the line 7—7 of FIGURE 3, showing one end of the tank attaching means and one of the winches used to raise and lower the water distributing and spreading member; and FIGURE 8 is a view on an enlarged scale, taken on the line 8—8 of FIGURE 1.

Referring to the drawings in which like numerals indicate like parts throughout the several views, the apparatus of the present invention for calibrating the liquid capacity of a tank in multiples of a known liquid measure unit comprises a standard 10 telescopingly arranged within a base 12 having vertically arranged adjusting screws in each corner for maintaining the base 12 in a level condition, the screws being designated by the numeral 14.

The standard 10 is composed of two sections 16 and 18 with the section 18 telescopingly arranged within the section 16. The standard section 16 is telescopingly arranged within a hollow post 20 which projects upwardly from the base 12. Thumb nuts 22 secure the sections 16 and 18 together in any position of their adjusted movement and also secure the section 16 in any position of its telescoping movement upwardly or downwardly within the post 20.

The upper end portion of the standard section 18 carries a platform 24 having depending therefrom a sleeve 26 which receives the upper end portion of the section 18.

Two liquid measure units, in the form of cans 28 and 30, are supported upon the platform 24. Each can 28 and 30 is adapted to be fully charged with a body of water corresponding to a known volume, such volume being the same for both cans 28 and 30. As an example, the cans 28 and 30 may each hold five gallons liquid measure.

When the apparatus of the present invention is in use, the standard 10 is positioned exteriorly of and adjacent a tank 32 which is to be calibrated. The standard sections 16 and 18 are secured in a position in which the platform 24 is above the top of the tank 32. A trough 34 is cooperatively mounted with respect to the cans 28 and 30 and is carried by the platform 24. A pipe 36, embodying a discharge outlet, is associated with each tank 28 and 30 and has one end opening into communication with the bottom of such tank 28 or 30 and the other end opening over the trough 34. A flap valve 38, constituting valve means, is carried on the free end of each pipe 36 and is held in the closed position by a cam member 40 mounted upon an arm 42 having a weighted head 44 at the free end thereof.

A filling unit comprising a horizontally disposed water supply head in the form of an elongated housing 46 having an open front 48 is positioned within the tank 32 so that the open front 48 of the housing 46 is in contacting engagement with the inner surface of the wall of the tank 32, as shown in FIGURE 3. Positioned within the housing 46 in spaced relation with respect to the open front 48 is a pipe 50 having a plurality of discharge orifices 52 and 54 arranged in spaced relation therealong. The pipe is positioned so that the orifices 52 and 54 face the open front 48 of the housing 46. The orifices 52 are of a larger diameter than the orifices 54, as shown in FIGURE 4.

A resilient line distributing and spreading member, in the form of a brush 56, is dependingly carried by the housing 46 and has the bristles thereof pointing downwardly and engaging the adjacent portion of the inner surface of the wall of the tank 32, as shown in FIGURE 3, the bristles being designated by the reference numeral 58.

Conduit means, in the form of a hose 60, connects the bottom of the trough 34 with the interior of the pipe 50 so that water discharged from either of the cans 28 or 30 into the trough 34 is conveyed through the hose 60 into the pipe 50 and from there dispensed out of the orifices 52 and 54 against the inner surface of the wall of the tank 32 to form a sheet of water falling out of the lower end of the housing 46 and in between the individual bristles 58 of the brush 56 so that the level of the water in the tank 32 is maintained quiescent and substantially free of air bubbles.

The housing 46 is resiliently mounted so that it moves easily on the inner surface of the tank wall from an initial position near the bottom of the tank to a position near the top of the tank as the tank is filled. The mounting for the housing 46 includes a vertically disposed plate member 62 having clamp means 64 on its lower end for securement to the wall of the tank 32, as shown in FIGURE 3.

A resilient rod 66 is arranged in an upright direction and has its lower end fixedly secured to the midportion of the housing 46, as shown in FIGURE 3. A first guide rod 68 is arranged horizontally and extends through a hole provided in the plate member 62 adjacent the upper end of the latter. The guide rod 68 has its free end provided with a bifurcated portion 70 receiving the adjacent part of the rod 66. A nut 72 is threaded on the portion of the guide rod 68 inwardly of the bifurcated portion 70 and a coil spring 74 is circumposed about the portion of the guide rod 68 between the nut 72 and the plate member 62, as shown in FIGURE 5.

A second guide rod 76 extends through a hole provided in the plate member 62 intermediate the ends of the latter and is provided on one end with a hook 78 (FIGURE 6) removably receiving the adjacent portion of the rod 66. A nut 80 is threaded on the portion of the rod 76 remote from the hook 78 and a coil spring 82 is circumposed about the portion of the rod 76 between the nut 80 and the plate member 62.

Referring to FIGURE 3, it will be seen that the spring 74 biases the first guide rod 68 to the right of the plate member 62 while the spring 82 biases the second guide rod 76 to the position in which the hook 78 exerts a pull upon the adjacent part of the rod 66. This serves to maintain the housing 46 in frictional engagement with the inner surface of the wall of the tanks 32 in all positions of its movement upwardly and downwardly within the tank 32.

Hand actuable means is provided for periodically raising the housing 46 so that the bristles 38 of the brush 56 are maintained adjacent the surface of the water after admission of the water into the tank 32, as shown in FIGURE 3. Specifically, the hand actuable means consists in a horizontally disposed rotatable shaft 84 mounted in brackets 86 projecting from each end of the plate member 62 on the side of the latter opposite to the housing 46. A pair of winch drums 88 are carried on the shaft 84 inwardly of the brackets 86 and each carries a cable 90 having one end fixed to the drum 88 and the other end secured to an end portion of the housing 46. A hand wheel 92 on one end of the shaft 84 provides means on which the winch drum 88 may be rotated to raise the housing 46 along the inner surface of the wall of the tank 32 as water is admitted into the tank 32. The cable 90 at each end of the shaft 84 travels over an idler pulley 94 supported on a bracket 96 secured to the face of the plate member 62 contiguous with the housing 46.

An arm 98 projects horizontally out from the side of the plate member 62 contiguous to the housing 46 and above the housing 46 and has its free end connected by a coil spring 100 to a midpart of another arm 102 also mounted upon the plate member 62 for pivotal movement about a horizontal axis. The coil spring 100 applies tension to the arm 102 which has a plurality of loop portions 104 embracing the adjacent parts of the hose 60. The spring 100 maintains the hose 60 in a position in which water therein will drain readily into the housing 46, as shown in FIGURE 2.

A U-shaped pipe assembly 106 is secured to the platform 24 on three sides of the latter and has its bight portion connected by a hose 108 to a source of water under pressure. Flexible inlet hoses 110 connect the free ends of the legs of the pipe assembly 106 with the open upper ends of the cans 28 and 30 for filling of the latter in response to opening of the valve 112 in the pipe assembly 106 on each leg thereof.

Each can 28 and 30 is provided with a sight glass 114 having indicia thereon indicating the full mark so that the can 28 or 30 may be accurately filled with a body of water corresponding to a unit of measure, such as five gallons or the like.

In use, the base 12 is first positioned exteriorly of the tank 32 to be calibrated and the standard 10 erected in the post 20 and the platform 24 positioned above the level of the tank 32. The cans 28 and 30 are then placed upon the platform 24 and the inlet or supply hose 108 connected to a source of water under pressure. The cans 28 and 30 are then filled through their hoses 110 and the respective valve 112 closed when each can 28 and 30 has received its body of water to the volume mark on the sight glass 114.

The plate member 62 is now clamped on the side wall of the tank 32 and the housing 46 is lowered into the tank 32 to a position adjacent the bottom thereof with the rod 66 held in the hook 78 and bifurcated portion 70 of the guide rods 76 and 68, respectively. Next, the arms 98 and 102 are secured to the plate member 62 and the hose 60 is dependingly supported by the arm 102 in such a position that water drains freely from the trough 34 to the housing 46.

One of the valves 38 is now opened and the water is permitted to drain from the respective can 28 or 30 into the trough 34 and through the hose 60 to the housing 46 and thence out the pipe orifices 52 and 54 into the bristles 58 of the brush 56. The water will flow in the form of a sheet downwardly on the inner surface of the wall of the tank 32 and as the water collects in the bottom of the tank 32, the surface of the water will not be disturbed by ripples, air bubbles or the like. After each five gallons of water from the can 28 or 30 is admitted to the tank 32, or other predetermined unit of volume, a dipstick 116 (FIGURE 2) is inserted into the tank 32 and either a mark is made upon the dipstick or if the dipstick is calibrated in units of measurement, the depth of the water in the tank 32 is noted. If other means of sensing the depth of the water in the tank is employed, a notation is made for each increment in depth resulting from admission into the tank of the contents of the cans 28 and 30 successively.

After the first can has been emptied, it is refilled through the hose 108 and valve 112 while the other can is being emptied into the trough 34. This enables a single operator to alternatingly empty the cans 28 and 30 and in a short period of time between the emptying of the cans 28 and 30 measure the depth of water admitted into the tank 32 after each can 28 or 30. Simultaneously, with the emptying of either of the cans 28 or 30, the hand wheel 92 is turned slowly to raise the housing 46 so that the bristles 58 of the brush 56 are always maintained adjacent to and projecting slightly into the surface of the water within the tank 32, as shown in FIGURE 3.

When the tank 32 has been filled with water from the cans 28 and 30 and a chart has been made showing the depth of water at each point at which a can has been emptied, the apparatus may be removed and dismantled and the tank 32 emptied of water and prepared for the storage of milk therein. The chart thus formed will be useful in determining the gallonage of milk within the tank 32 at any level therein whether such depth of milk within the tank 32 is measured by a dipstick or by other liquid level sensing means installed on the tank.

It will be seen therefore that the apparatus of the present invention provides a means by which the volume capacity of a liquid storage tank may be efficiently computed and calibrated with little or no chance for inaccuracy. The operators of dairy products processing plants may depend upon the apparatus of the present invention to accurately calibrate the milk storage tanks of dairy farmers supplying such plants and when the gallonage of the milk delivered or taken from such tanks is known, the weight of the milk is easily computed according to known methods. Civic authorities having cognizance over weights and measures will find the apparatus of the present invention useful in rapidly and with facility determining the liquid volume capacity of tanks under their jurisdiction.

What is claimed is:

1. In combination with a tank, of a filling unit comprising a horizontally-disposed water supply head provided with an open front positioned within said tank below the top thereof and having the open front in contacting engagement with the inner surface of the wall of said tank, means for admitting water to the interior of said head, a pipe having a plurality of discharge orifices arranged in spaced relation therealong disposed within said head with said orifices facing said head open front, a resilient member for discharging and spreading a liquid in a line dependingly carried by said head and having the lower end portion engaging the adjacent portion of the inner surface of the wall of said tank for maintaining the level of the admitted water into said tank quiescent and substantially free of air bubbles, and means operatively connected to said head and detachably secured to said tank for holding said head in contacting engagement with the inner surface of the wall of said tank.

2. The combination according to claim 1 wherein said discharge orifices are disposed in two lines with the orifices in one line being of a larger size than the orifices in the other line.

3. The combination according to claim 1 wherein said member embodies a horizontally-disposed brush whose bristles engage the inner surface of the wall of said tank.

4. The combination according to claim 1 which includes in addition means connecting said head to said means for movement upwardly along the inner surface of the wall of said tank.

References Cited in the file of this patent

UNITED STATES PATENTS

| | | |
|---|---|---|
| 1,194,846 | King | Aug. 15, 1916 |
| 1,973,652 | Parsons | Sept. 11, 1934 |
| 2,034,661 | McCauley | Mar. 17, 1936 |
| 2,171,721 | Bingell | Sept. 5, 1939 |
| 2,208,028 | Harrington | July 16, 1940 |
| 2,233,325 | Raines | Feb. 25, 1941 |
| 2,740,571 | Busto | Apr. 3, 1956 |
| 2,778,218 | Sault | Jan. 22, 1957 |

FOREIGN PATENTS

| | | |
|---|---|---|
| 6,212 | Denmark | Dec. 21, 1903 |